July 28, 1925.

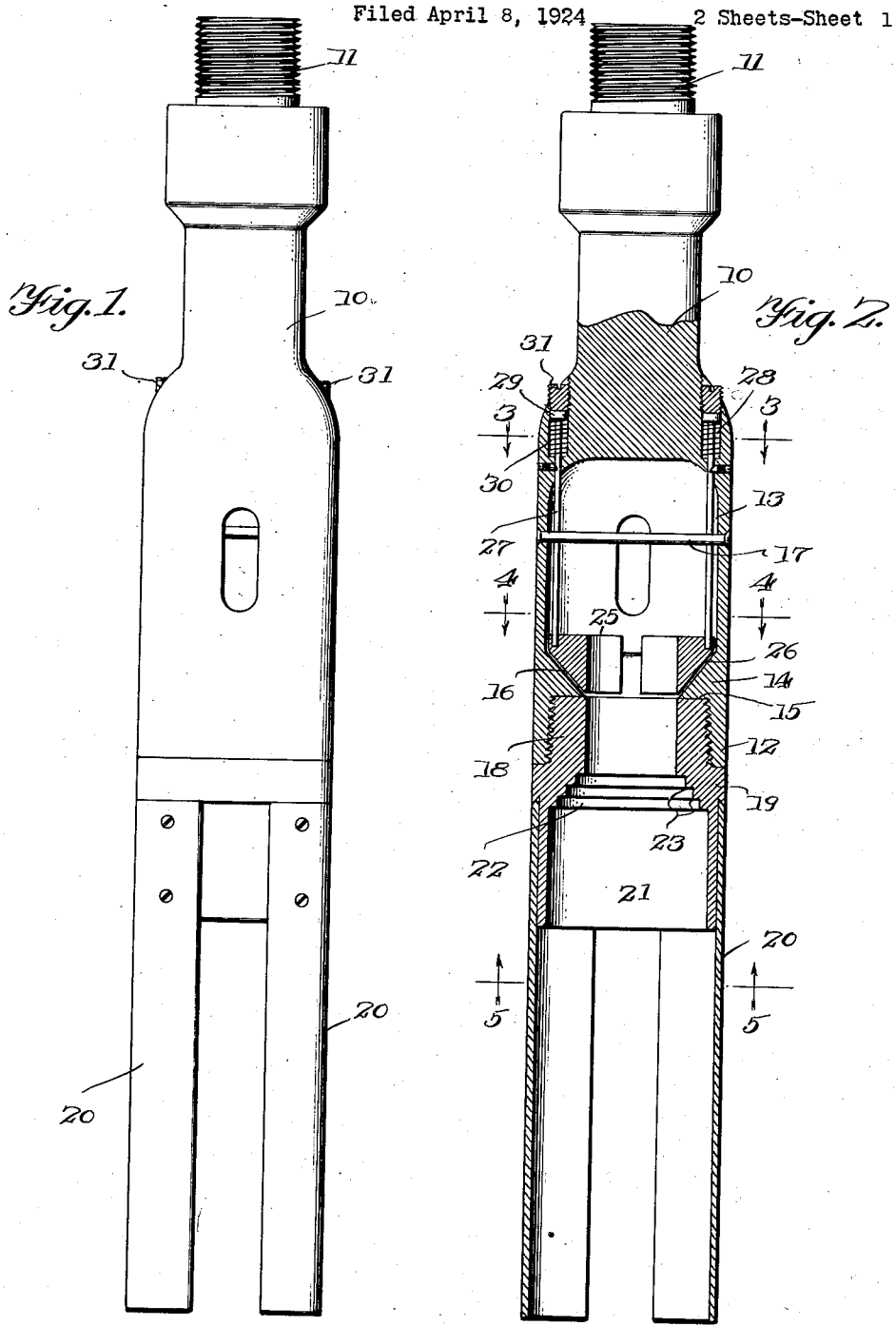

J. B. CLARK

WELL FISHING TOOL

Filed April 8, 1924

J. B. Clark
INVENTOR

BY Victor J. Evans
ATTORNEY

WITNESS:

Patented July 28, 1925.

1,547,901

UNITED STATES PATENT OFFICE.

JAMES B. CLARK, OF MIDWEST, WYOMING.

WELL-FISHING TOOL.

Application filed April 8, 1924. Serial No. 705,092.

*To all whom it may concern:*

Be it known that I, JAMES B. CLARK, a citizen of the United States, residing at Midwest, in the county of Natrona and State of Wyoming, have invented new and useful Improvements in Well-Fishing Tools, of which the following is a specification.

This invention relates to tools for use in fishing out lost tools from oil wells and the like and has for its object the provision of a novel tool for this purpose which will efficiently operate to perform its functions regardless of whether the lost tools be absolutely free or whether they may have a certain amount of broken wire or cable attached to them.

Another object is the provision of a device of this character having a peculiar slip arrangement which operates automatically and which is provided with novel releasing means.

An additional object is the provision of a device of this character which will be simple and inexpensive in manufacture, easy to use, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the tool,

Figure 2 is a longitudinal section therethrough,

Figure 3:
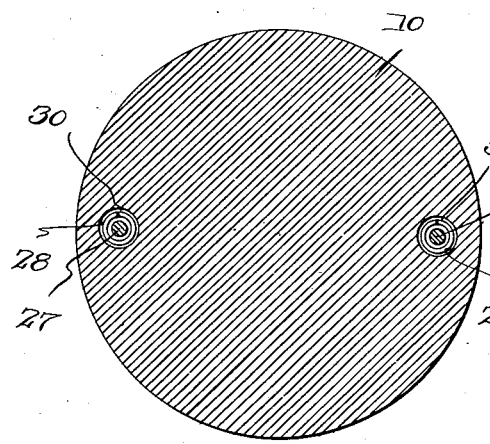
Figure 3 is a cross section on the line 3—3 of Figure 2.
Figure 4:
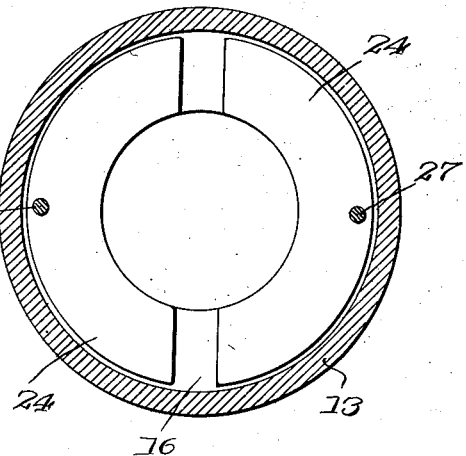
Figure 4 is a cross section on the line 4—4 of Figure 2.
Figure 5:
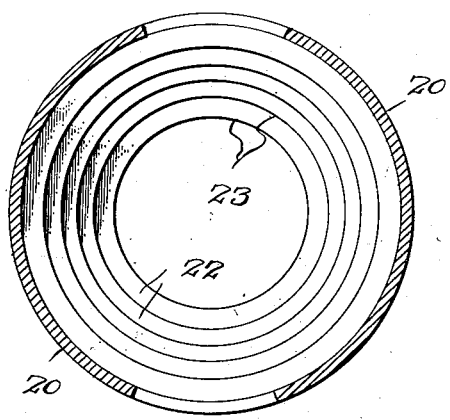
Figure 5 is a cross section on the line 5—5 of Figure 2.
Figure 6:
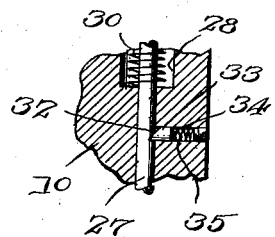
Figure 6 is a detail section showing the latch means on a larger scale.

Referring more particularly to the drawings the numeral 10 designates a body which is elongated in shape and formed at its upper end with a reduced threaded extension 11 adapted for engagement within a suitable socket which may be attached to a suspension means for lowering the tool into a well. The lower end 12 of this body is open and internally threaded as shown and the intermediate portion 13 is hollow and communicating with the open lower end, a peculiarly shaped ledge or flange 14 being provided near the open end. This ledge has its bottom surface formed as a square shoulder 15 and has its upper surface 16 inclined as shown. Traversing the body at the hollow central portion thereof is a stop 17 for a purpose to be described.

Screwed into the open lower end 12 of the body is a reduced threaded extension 18 on a head 19 which carries partially circular depending spring jaws 20. The head 18 is formed with a bore 21 which has its lower end of maximum size and its upper end relatively small, the intermediate portion of the bore being stepped as indicated at 22 to provide a series of cutting edges 23.

Located within the hollow portion 13 of the body are slips 24 which are nearly semi-circular in shape and which have square upper surfaces 25 and inclined lower surfaces 26 co-operating with the inclined surface 16 of the ledge 14. Secured to and projecting upwardly from these slips are rods 27 which are slidable through recesses 28 in the upper portion of the body and which carry heads 29 resting upon coil springs 30 seated in the recesses. Screwed into the recesses are grub screws 31 which engage the heads 29 for holding the slips down to a certain extent. Each rod 27 is formed in one side with a notch 32 normally engaged by a plunger or catch 33 slidable within a recess 34 in the side of the body and urged toward the rod by a small spring 35 which, in turn is held in adjusted position by a grub screw 36 all of which parts constitute a trigger device.

In the use of the device, it is lowered into a well from which a lost tool is to be recovered and it will be observed that the resilient nature of the jaws 20 is such as to cause them to hug the well casing so as to engage outwardly of any tools which might be in the well so that the tools will be received between the jaws. Any loose ends of wire or cable attached to the lost tools will be cut by the edges 23 at the stepped portion of the bore 21 in the head 19. A tool engaged between the jaws will of course enter and pass through the bore 21, as the device is lowered over the tool, and the head or other projection thereon will pass up between the slips 25, upward movement being limited by the transverse stop pin 17. The slips can move outwardly to a certain extent but when the weight of a tool head comes upon them upon subsequent raising of the device, the pressure of the inclined surfaces 26 of the slips against the inclined surfaces 16 of the ledge will cause the slips to be moved together or toward each other, thereby effecting a clamping action on the tool being lifted out. The springs 30 permit the yielding action. The purpose of the catch device or plungers 33 is to hold the rods 27 initially in their uppermost positions.

From the foregoing description and a study of the drawings it will be apparent that I have thus provided a simply constructed, inexpensive and highly efficient device for recovering lost tools from wells. Owing to the simplicity of the construction and the fewness of the parts it is apparent that there is very little to get out of order so that the device should have a long and satisfactory life.

While I have shown and described the preferred embodiment of my invention it is of course to be understood that I reserve the right to make such changes in the form, construction and arrangement of parts as will not depart from the spirit of the invention or the scope of the subjoined claim.

I claim:

A well fishing tool comprising an elongated body having a hollow central portion and an open lower end and provided interiorly with a ledge having an inclined upper surface, and slips within the hollow portion of the body having inclined surfaces co-operating with the inclined surface of the ledge, rods carried by said slips and slidable through a portion of the body, heads on said rods, and coil springs engaging said heads for normally urging the slips upwardly, screw members engaging said heads for limiting the movement thereof, and spring pressed plungers slidable laterally with respect to said rods for holding the same in adjusted position.

In testimony whereof I affix my signature.

JAMES B. CLARK.